United States Patent
Lee et al.

(10) Patent No.: US 11,218,896 B2
(45) Date of Patent: ***Jan. 4, 2022

(54) METHOD FOR CALCULATING AN AMOUNT OF DATA AVAILABLE FOR TRANSMISSION AND A DEVICE THEREFOR

(71) Applicant: LG Electronics Inc., Seoul (KR)

(72) Inventors: Sunyoung Lee, Seoul (KR); Seungjune Yi, Seoul (KR); Youngdae Lee, Seoul (KR); Sungjun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/366,059

(22) Filed: Mar. 27, 2019

(65) Prior Publication Data

US 2019/0223039 A1    Jul. 18, 2019

Related U.S. Application Data

(63) Continuation of application No. 15/805,468, filed on Nov. 7, 2017, which is a continuation of application
(Continued)

(51) Int. Cl.
*H04W 24/10* (2009.01)
*H04W 72/12* (2009.01)
(Continued)

(52) U.S. Cl.
CPC ............ *H04W 24/10* (2013.01); *H04B 7/022* (2013.01); *H04W 24/02* (2013.01);
(Continued)

(58) Field of Classification Search
None
See application file for complete search history.

(56) References Cited

U.S. PATENT DOCUMENTS 8,116,274 B2    2/2012   Marinier et al.
8,644,241 B1    2/2014   Winter et al.
(Continued)

FOREIGN PATENT DOCUMENTS

CN    101741798    6/2010
CN    101779391    7/2010
(Continued)

OTHER PUBLICATIONS

Alcatel-Lucent et al., "MAC and PHY modifications required for dual connectivity support," 3GPP TSG-RAN WG2 Meeting #82, R2-131964, Fukuoka, Japan, May 20-24, 2013, pp. 1-4.
(Continued)

*Primary Examiner* — Ajit Patel
*Assistant Examiner* — Rodrick Mak
(74) *Attorney, Agent, or Firm* — Fish & Richardson P.C.

(57) ABSTRACT

A method for a base station (BS) operating in a wireless communication system, the method includes transmitting, to a user equipment (UE), first information indicating a threshold value for an uplink data split operation; and receiving a buffer status report (BSR) from the UE, wherein a value of a buffer size in the BSR is determined based on second information that indicates an amount of data available for transmission for a packet data convergence protocol (PDCP) entity of the UE when the amount of the data available for transmission is larger than the threshold value.

14 Claims, 14 Drawing Sheets

Related U.S. Application Data

No. 14/902,264, filed as application No. PCT/KR2014/006593 on Jul. 21, 2014, now Pat. No. 9,820,176.

(60) Provisional application No. 61/858,621, filed on Jul. 26, 2013.

(51) Int. Cl.
| | |
|---|---|
| H04W 76/27 | (2018.01) |
| H04W 28/02 | (2009.01) |
| H04W 24/02 | (2009.01) |
| H04B 7/022 | (2017.01) |

(52) U.S. Cl.
CPC ... *H04W 28/0278* (2013.01); *H04W 72/1284* (2013.01); *H04W 76/27* (2018.02)

(56) References Cited

U.S. PATENT DOCUMENTS

| | | |
|---|---|---|
| 2008/0212506 A1 | 9/2008 | Lee et al. |
| 2008/0317159 A1 | 12/2008 | Monisley et al. |
| 2009/0052420 A1 | 2/2009 | Fischer |
| 2009/0125650 A1 | 5/2009 | Sebire |
| 2009/0286541 A1 | 11/2009 | Maheshwari et al. |
| 2009/0296637 A1 | 12/2009 | Fischer |
| 2010/0074222 A1 | 3/2010 | Wu |
| 2010/0080185 A1* | 4/2010 | Guo .............. H04L 1/1848 370/329 |
| 2010/0142457 A1* | 6/2010 | Chun ............ H04W 72/1284 370/329 |
| 2010/0189006 A1 | 7/2010 | Mallick et al. |
| 2010/0190504 A1 | 7/2010 | Lee et al. |
| 2010/0202420 A1 | 8/2010 | Jersenius et al. |
| 2011/0242972 A1* | 10/2011 | Sebire ............ H04W 28/12 370/229 |
| 2011/0299476 A1 | 12/2011 | Fischer |
| 2012/0281564 A1 | 11/2012 | Zhang et al. |
| 2013/0034014 A1 | 2/2013 | Jonsson et al. |
| 2013/0176988 A1 | 7/2013 | Wang et al. |
| 2014/0051454 A1* | 2/2014 | Wirtanen ........... H04W 76/27 455/452.1 |
| 2014/0056243 A1 | 2/2014 | Pelletier et al. |
| 2014/0126399 A1 | 5/2014 | Damnjanovic et al. |
| 2014/0307622 A1 | 10/2014 | Horn et al. |
| 2015/0110040 A1* | 4/2015 | Zhao ............ H04W 72/1268 370/329 |
| 2015/0215945 A1* | 7/2015 | Hsu ............ H04W 72/0486 370/254 |
| 2015/0223270 A1* | 8/2015 | Kim ............ H04W 74/0833 370/329 |
| 2015/0327116 A1 | 11/2015 | Zhang et al. |
| 2016/0066276 A1 | 3/2016 | Su et al. |
| 2016/0100397 A1 | 4/2016 | Wen et al. |
| 2016/0234714 A1* | 8/2016 | Basu Mallick ....... H04W 16/32 |
| 2017/0013498 A1 | 1/2017 | Yi et al. |
| 2017/0295590 A1* | 10/2017 | Loehr .............. H04W 72/1242 |
| 2019/0297523 A1 | 9/2019 | Mallick et al. |

FOREIGN PATENT DOCUMENTS

| | | |
|---|---|---|
| CN | 101795494 | 8/2010 |
| CN | 101971544 | 2/2011 |
| CN | 102348292 | 2/2012 |
| CN | 103039109 | 4/2013 |
| EP | 2197235 | 6/2010 |
| EP | 3043614 | 7/2016 |
| JP | 2013520096 | 5/2013 |
| JP | 2013524605 | 6/2013 |
| JP | 2016-501454 | 1/2016 |
| JP | 2016-524848 | 8/2016 |
| KR | 1020020081449 | 10/2002 |
| KR | 1020080097150 | 11/2008 |
| KR | 10-2010-0034165 | 4/2010 |
| KR | 10-2011-0129835 | 12/2011 |
| KR | 1020130025392 | 3/2013 |
| KR | 1020130059378 | 6/2013 |
| WO | WO2008/156300 | 12/2008 |
| WO | WO 2011/100492 | 8/2011 |
| WO | WO2014074656 | 5/2014 |
| WO | WO 2014/161168 | 10/2014 |

OTHER PUBLICATIONS

InterDigital Communications, "User Plane Architecture for Dual-Connectivity," R2-131939, 3GPP TSG-RAN WG2 #82, Fukuoka, Japan, dated May 20-24, 2013, 7 pages.

Japanese Office Action in Japanese Application No. 2019-11088, dated Apr. 7, 2020, 7 pages (with English translation).

United States Notice of Allowance in U.S. Appl. No. 15/805,468, dated Jun. 22, 2020, 7 pages.

KR Notice of Allowance in Korean Appln. No. 10-2015-7036303, dated Feb. 24, 2021, 4 pages (with English translation).

Extended European Search Report in European Appln. No. 21185508. 5, dated Sep. 30, 2021, 10 pages.

* cited by examiner (a) Control-Plane Protocol Stack (b) User-Plane Protocol Stack Component carrier 5 component carriers → 100 MHz C-Plane connectivity of eNBs involved in dual connectivity U-Plane connectivity of eNBs involved in dual connectivity

METHOD FOR CALCULATING AN AMOUNT OF DATA AVAILABLE FOR TRANSMISSION AND A DEVICE THEREFOR

CROSS-REFERENCE TO RELATED APPLICATIONS

This application is a continuation of U.S. application Ser. No. 15/805,468, filed on Nov. 7, 2017, which is a continuation of U.S. patent application Ser. No. 14/902,264, filed on Dec. 30, 2015, now U.S. Pat. No. 9,820,176, which is the National Phase of International Application No. PCT/KR2014/006593, filed on Jul. 21, 2014, which claims the benefit under 35 U.S.C. § 119(e) to U.S. Provisional Application No. 61/858,621, filed on Jul. 26, 2013, all of which are hereby expressly incorporated by reference into the present application.

BACKGROUND OF THE INVENTION

Field of the Invention

The present invention relates to a wireless communication system and, more particularly, to a method for calculating an amount of data available for transmission and a device therefor.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

SUMMARY OF THE INVENTION

An object of the present invention devised to solve the problem lies in a method and device for a method for calculating an amount of data available for transmission. The technical problems solved by the present invention are not limited to the above technical problems and those skilled in the art may understand other technical problems from the following description.

The object of the present invention can be achieved by providing a method for operating by an apparatus in wireless communication system, the method comprising; receiving ratio for calculating amount of Data Available for Transmission (DAT) in a PDCP (Packet Data Convergence Protocol) entity; calculating an amount of DAT when data is arrived in the PDCP entity; and setting a first amount of DAT as the calculated amount of DAT and a second amount of DAT as 'zero', if the calculated amount of DAT is less than a threshold, wherein the first amount of DAT is for the first BS and the second amount of DAT is for the second BS.

In another aspect of the present invention provided herein is an apparatus in the wireless communication system, the apparatus comprising: an RF (radio frequency) module; and a processor configured to control the RF module, wherein the processor is configured to receive ratio for calculating amount of Data Available for Transmission (DAT) in a PDCP (Packet Data Convergence Protocol) entity, to calculate an amount of DAT when data is arrived in the PDCP entity, and to setting a first amount of DAT as the calculated amount of DAT and a second amount of DAT as 'zero', if the calculated amount of DAT is less than a threshold, wherein the first amount of DAT is for the first BS and the second amount of DAT is for the second BS.

Preferably, the method further comprises: dividing the calculated amount of DAT into the first amount of DAT and the second amount of DAT based on the ratio if the calculated amount of DAT is equal to or more than the threshold.

Preferably, the method further comprises: reporting the first amount of DAT to the first BS and the second amount of DAT to the second BS.

Preferably, wherein the second amount of DAT is not reported to the second BS if the second amount of DAT is set as 'zero'.

Preferably, the method further comprises: receiving configuration information through RRC signaling from a Master eNodeB (MeNB), wherein configuration information indicates whether the first BS is the MeNB or a Secondary eNB (SeNB).

Preferably, the method further comprising: receiving the threshold from at least the first BS or the second BS.

Preferably, wherein the ratio is configured per a radio bearer comprising one Packet Data Convergence Protocol (PDCP) entity, two Radio Link Control (RLC) entities and two Medium Access Control (MAC) entities for one direction.

It is to be understood that both the foregoing general description and the following detailed description of the present invention are exemplary and explanatory and are intended to provide further explanation of the invention as claimed.

According to the present invention, calculating amount of data available for transmission can be efficiently performed in a wireless communication system. Specifically, the UE can calculate and report each amount of data available for transmission to each base station in dual connectivity system.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE EMBODIMENTS

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
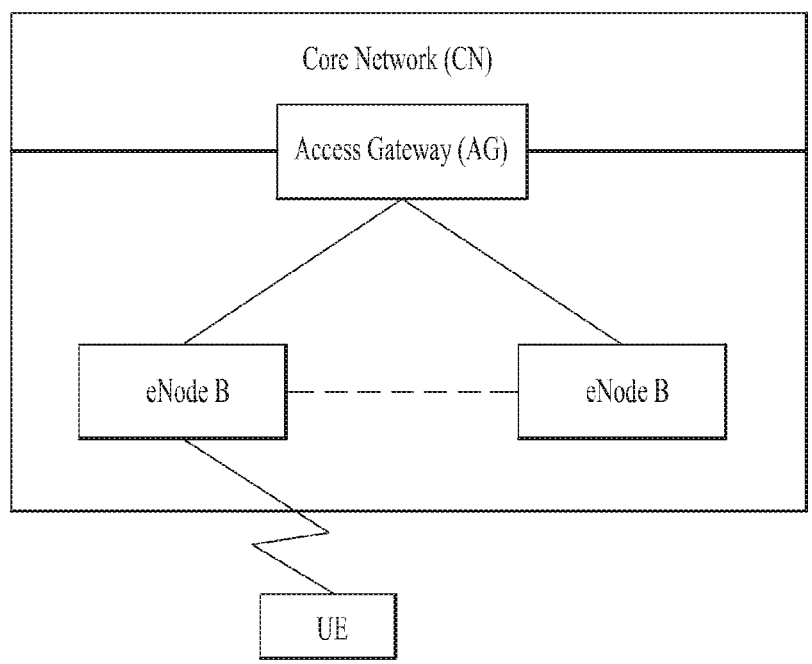
FIG. 1 is a diagram showing a network structure of an Evolved Universal Mobile Telecommunications System (E-UMTS) as an example of a wireless communication system.
Figure 2A:
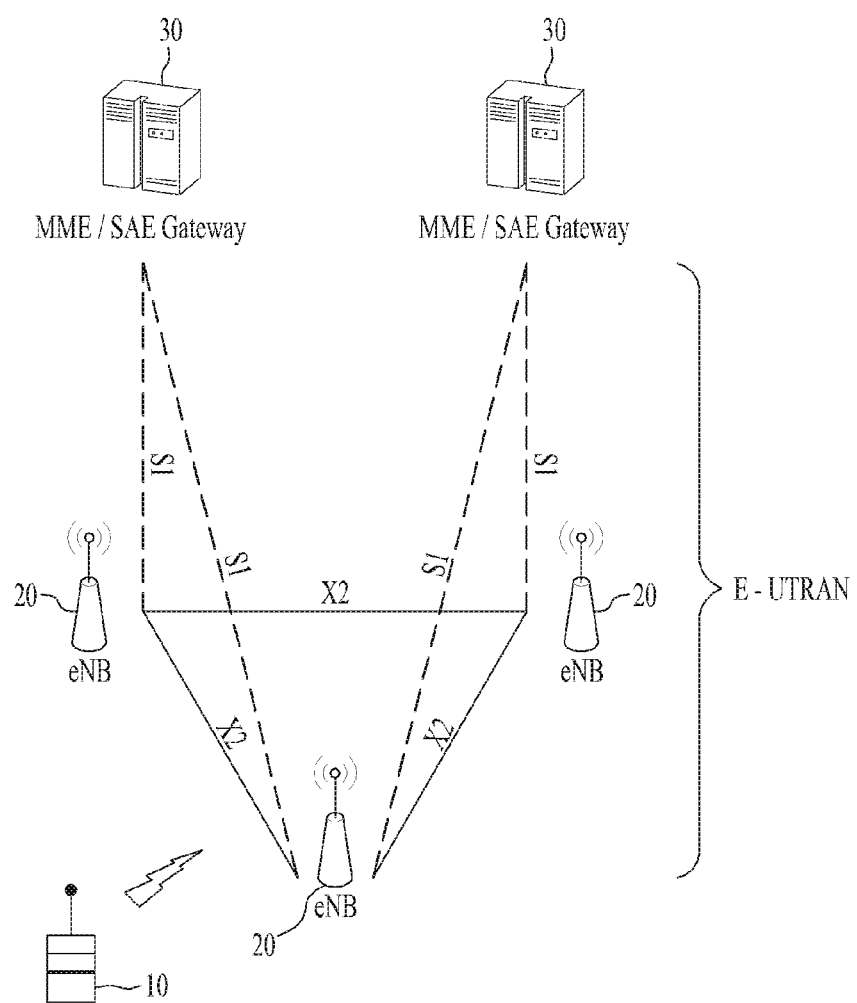
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
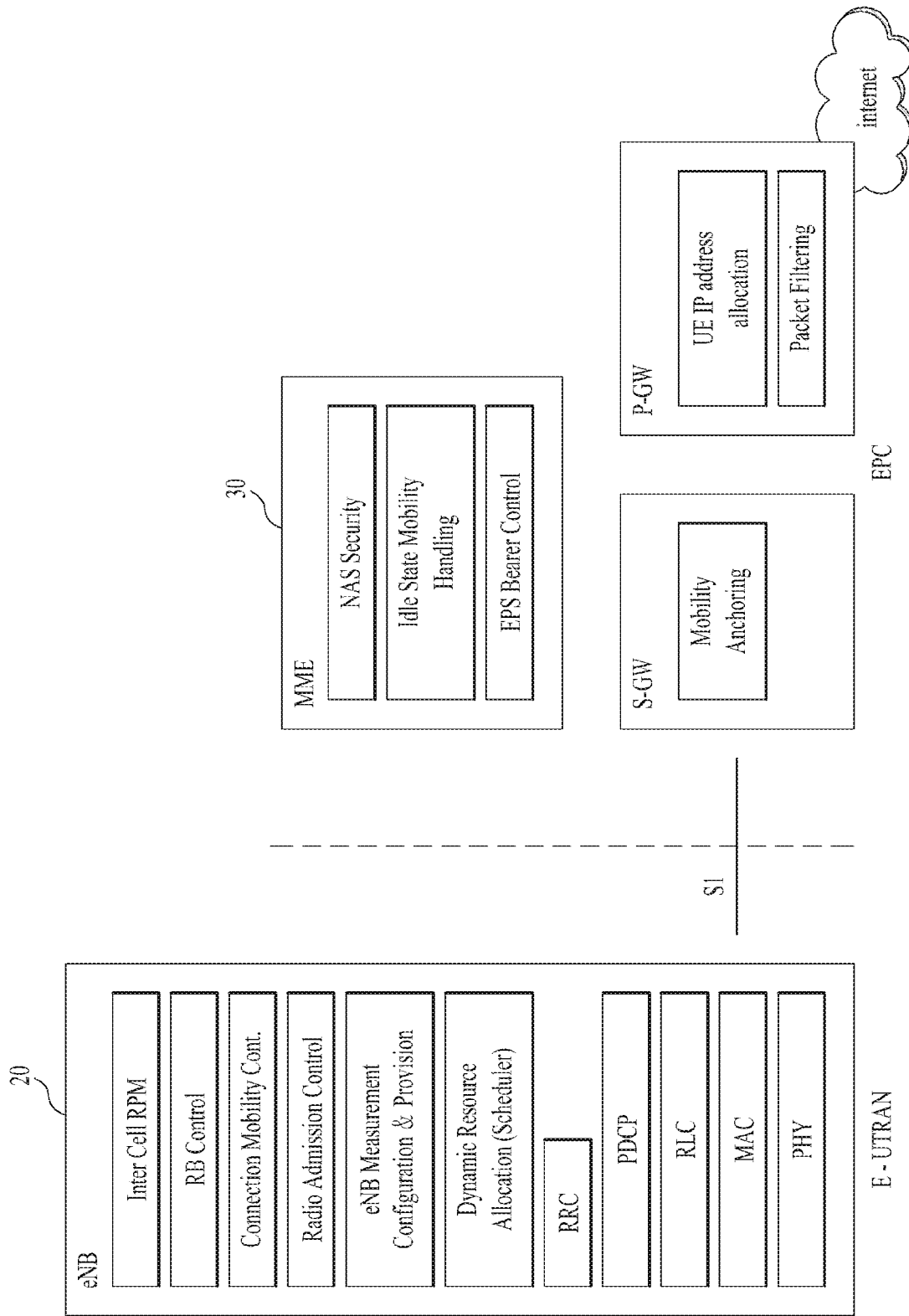
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
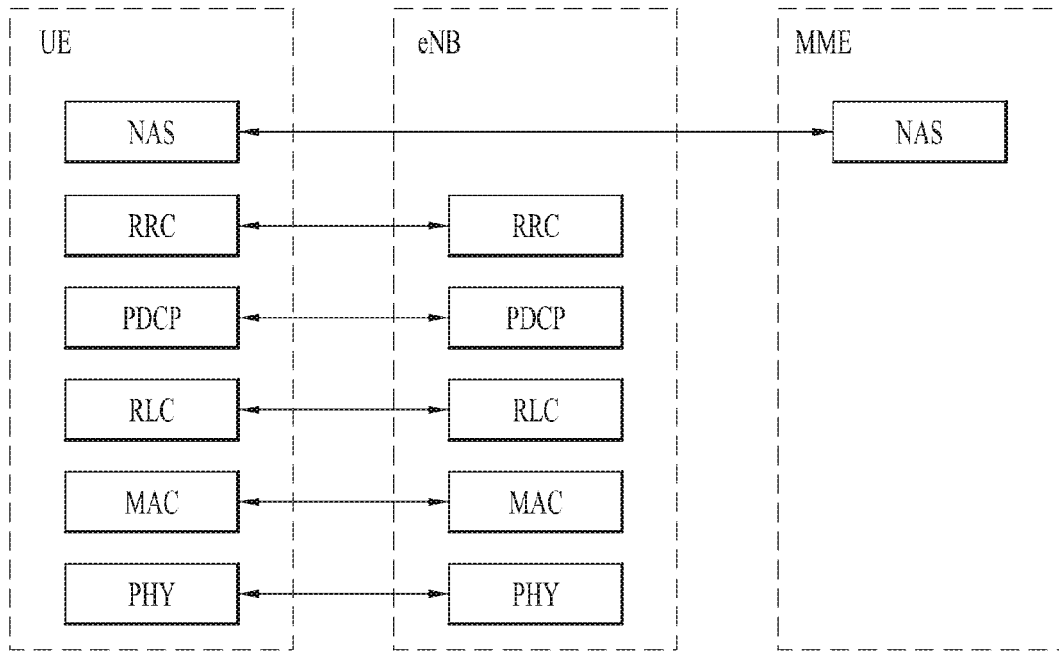
FIG. 3 is a diagram showing a control plane and a user plane of a radio interface protocol between a UE and an E-UTRAN based on a 3rd generation partnership project (3GPP) radio access network standard.
Figure 3:
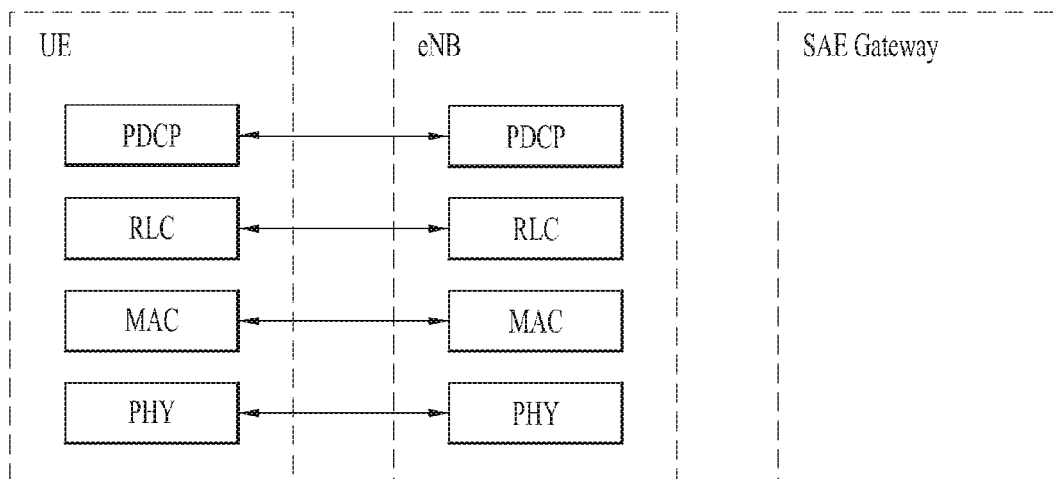

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
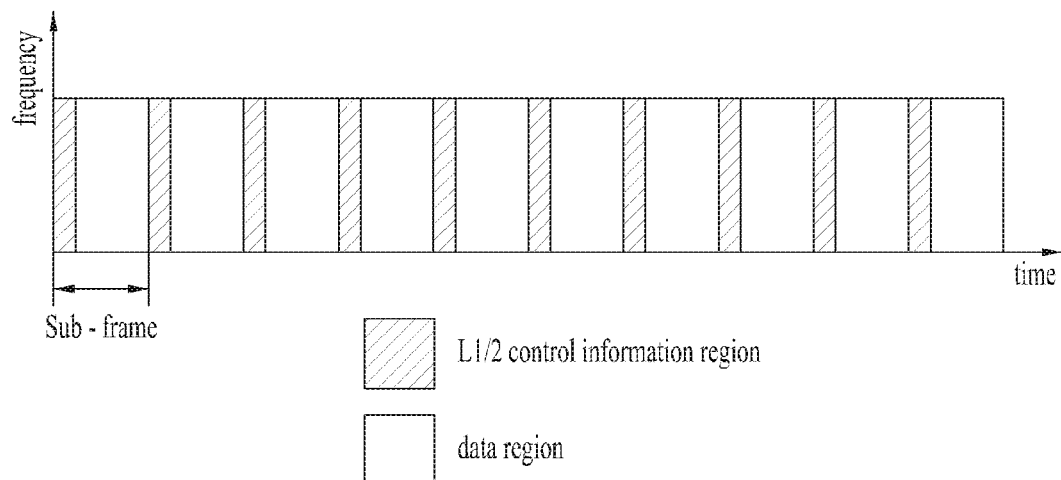
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
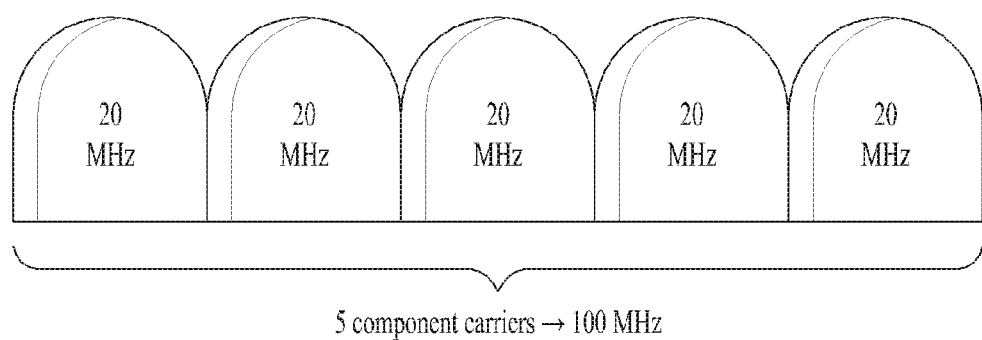
FIG. 5 is a diagram for carrier aggregation.

FIG. 5 is a diagram for carrier aggregation.

Carrier aggregation technology for supporting multiple carriers is described with reference to FIG. 5 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

Figure 6:
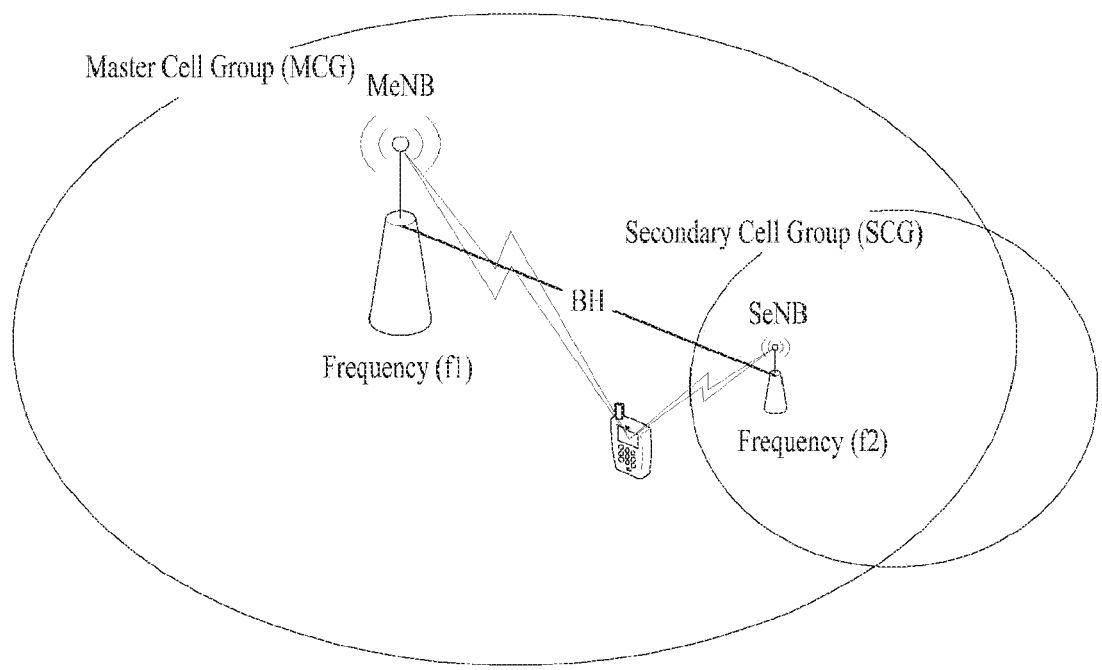
FIG. 6 is a conceptual diagram for dual connectivity between a Master Cell Group (MCG) and a Secondary Cell Group (SCG)

FIG. 6 is a conceptual diagram for dual connectivity (DC) between a Master Cell Group (MCG) and a Secondary Cell Group (SCG).

The dual connectivity means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

Figure 7A:
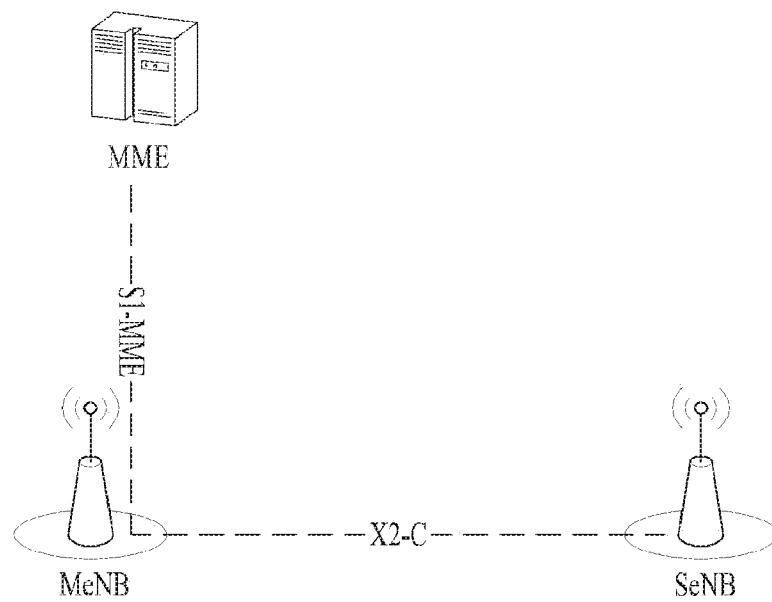
FIG. 7A is a conceptual diagram for C-Plane connectivity of base stations involved in dual connectivity.
Figure 7B:
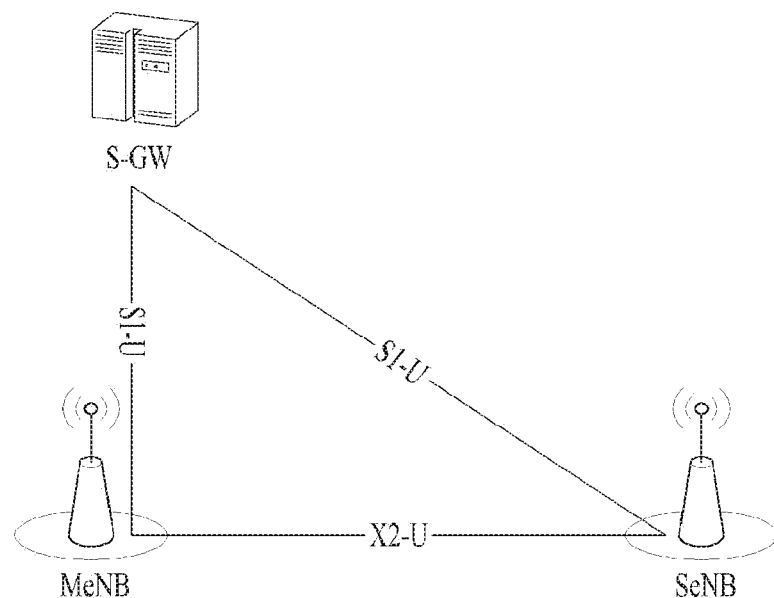
FIG. 7B is a conceptual diagram for U-Plane connectivity of base stations involved in dual connectivity.

FIG. 7A is a conceptual diagram for C-Plane connectivity of base stations involved in dual connectivity, and FIG. 7B is a conceptual diagram for U-Plane connectivity of base stations involved in dual connectivity.

FIG. 7A shows C-plane (Control Plane) connectivity of eNBs involved in dual connectivity for a certain UE. The MeNB is C-plane connected to the MME via S1-MME, the MeNB and the SeNB are interconnected via X2-C (X2-Control plane). As FIG. 7A, Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling.

FIG. 7B shows U-plane connectivity of eNBs involved in dual connectivity for a certain UE. U-plane connectivity depends on the bearer option configured: i) For MCG bearers, the MeNB is U-plane connected to the S-GW via S1-U, the SeNB is not involved in the transport of user plane data, ii) For split bearers, the MeNB is U-plane connected to the S-GW via S1-U and in addition, the MeNB and the SeNB are interconnected via X2-U, and iii) For SCG bearers, the SeNB is directly connected with the S-GW via S1-U. If only MCG and split bearers are configured, there is no S1-U termination in the SeNB. In the dual connectivity, enhancement of the small cell is required in order to data offloading from the group of macro cells to the group of small cells. Since the small cells can be deployed apart from the macro cells, multiple schedulers can be separately located in different nodes and operate independently from the UE point of view. This means that different scheduling node would encounter different radio resource environment, and hence, each scheduling node may have different scheduling results.

Figure 8:
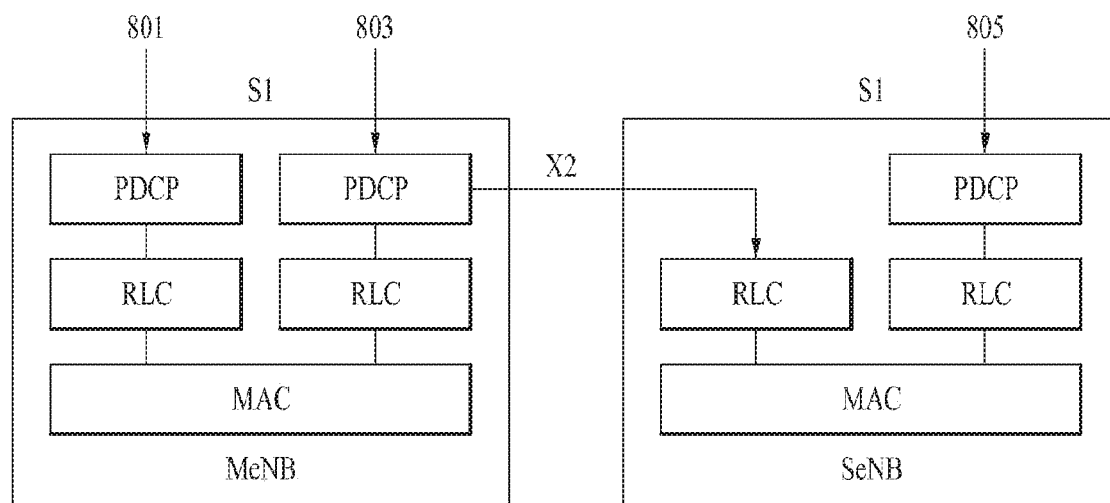
FIG. 8 is a conceptual diagram for radio protocol architecture for dual connectivity.

FIG. 8 is a conceptual diagram for radio protocol architecture for dual connectivity.

E-UTRAN of the present example can support dual connectivity operation whereby a multiple receptions/transmissions (RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity operation, the radio protocol architecture that a particular bearer uses depends on how the bearer is setup. Three alternatives exist, MCG bearer (801), split bearer (803) and SCG bearer (805). Those three alternatives are depicted on FIG. 8. The SRBs (Signaling Radio Bearers) are always of the MCG bearer and therefore only use the radio resources provided by the MeNB. The MCG bearer (801) is a radio protocol only located in the MeNB to use MeNB resources only in the dual connectivity. And the SCG bearer (805) is a radio protocol only located in the SeNB to use SeNB resources in the dual connectivity.

Specially, the split bearer (803) is a radio protocol located in both the MeNB and the SeNB to use both MeNB and SeNB resources in the dual connectivity and the split bearer (803) may be a radio bearer comprising one Packet Data Convergence Protocol (PDCP) entity, two Radio Link Control (RLC) entities and two Medium Access Control (MAC) entities for one direction. Specially, the dual connectivity operation can also be described as having at least one bearer configured to use radio resources provided by the SeNB.

Figure 9:
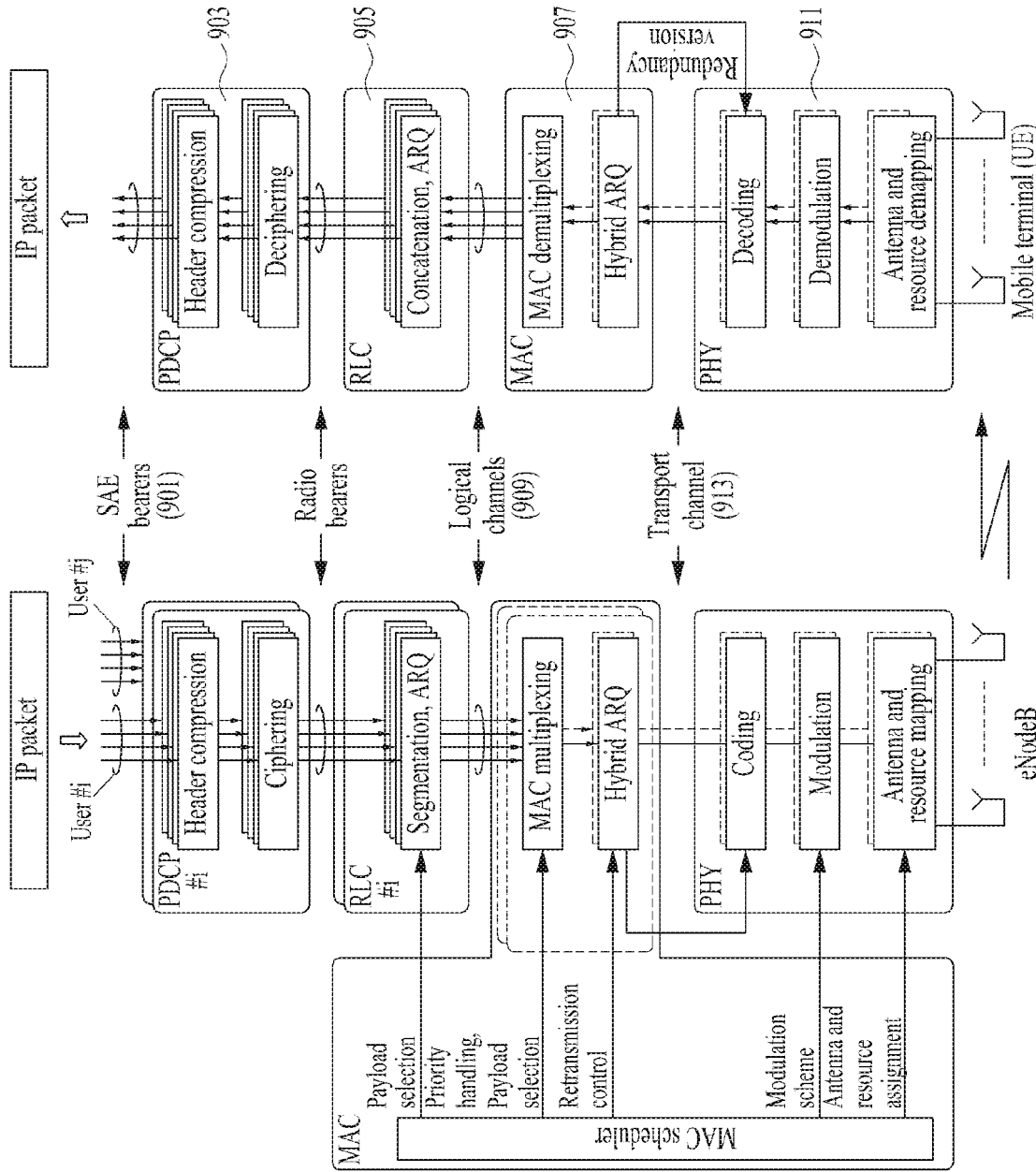
FIG. 9 is a diagram for a general overview of the LTE protocol architecture for the downlink.

FIG. 9 is a diagram for a general overview of the LTE protocol architecture for the downlink.

A general overview of the LTE protocol architecture for the downlink is illustrated in FIG. 9. Furthermore, the LTE protocol structure related to uplink transmissions is similar to the downlink structure in FIG. 9, although there are differences with respect to transport format selection and multi-antenna transmission.

Data to be transmitted in the downlink enters in the form of IP packets on one of the SAE bearers (901). Prior to transmission over the radio interface, incoming IP packets are passed through multiple protocol entities, summarized below and described in more detail in the following sections:

Packet Data Convergence Protocol (PDCP, 903) performs IP header compression to reduce the number of bits necessary to transmit over the radio interface. The header-compression mechanism is based on ROHC, a standardized header-compression algorithm used in WCDMA as well as several other mobile-communication standards. PDCP (903) is also responsible for ciphering and integrity protection of the transmitted data. At the receiver side, the PDCP protocol performs the corresponding deciphering and decompression operations. There is one PDCP entity per radio bearer configured for a mobile terminal.

Radio Link Control (RLC, 905) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (905) offers services to the PDCP (903) in the form of radio bearers. There is one RLC entity per radio bearer configured for a terminal.

Medium Access Control (MAC, 907) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (907) offers services to the RLC (905) in the form of logical channels (909).

Physical Layer (PHY, 911), handles coding/decoding, modulation/demodulation, multi-antenna mapping, and other typical physical layer functions. The physical layer (911) offers services to the MAC layer (907) in the form of transport channels (913).

The MAC (907) offers services to the RLC (905) in the form of logical channels (909). A logical channel (909) is defined by the type of information it carries and is generally classified into control channels, used for transmission of control and configuration information necessary for operating an LTE system, and traffic channels, used for the user data.

The set of logical-channel types specified for LTE includes:

Broadcast Control Channel (BCCH), used for transmission of system control information from the network to all mobile terminals in a cell. Prior to accessing the system, a mobile terminal needs to read the information transmitted on the BCCH to find out how the system is configured, for example the bandwidth of the system.

Paging Control Channel (PCCH), used for paging of mobile terminals whose location on cell level is not known to the network and the paging message therefore needs to be transmitted in multiple cells.

Dedicated Control Channel (DCCH), used for transmission of control information to/from a mobile terminal. This channel is used for individual configuration of mobile terminals such as different handover messages.

Multicast Control Channel (MCCH), used for transmission of control information required for reception of the MTCH.

Dedicated Traffic Channel (DTCH), used for transmission of user data to/from a mobile terminal. This is the logical channel type used for transmission of all uplink and non-MBMS downlink user data.

Multicast Traffic Channel (MTCH), used for downlink transmission of MBMS services.

Figure 10:
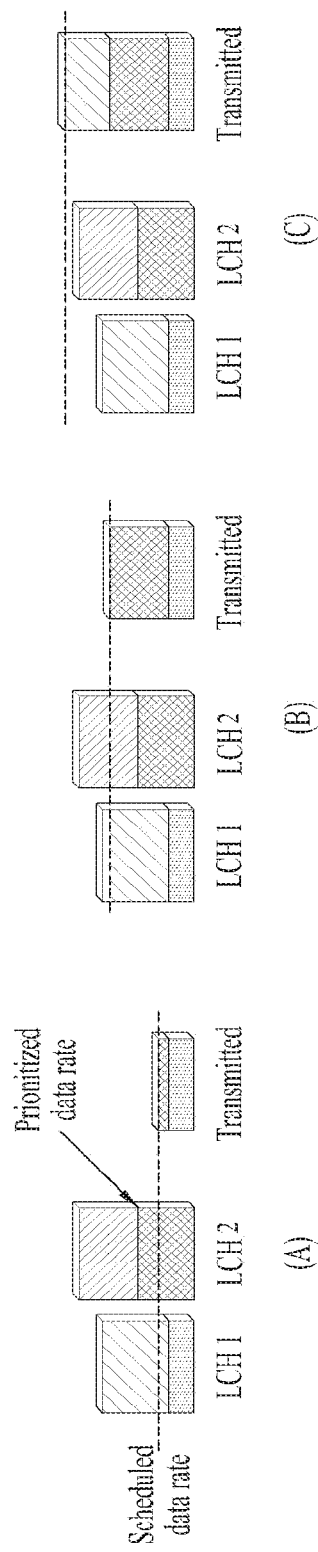
FIG. 10 is a diagram for prioritization of two logical channels for three different uplink grants.

FIG. 10 is a diagram for prioritization of two logical channels for three different uplink grants.

Multiple logical channels of different priorities can be multiplexed into the same transport block using the same MAC multiplexing functionality as in the downlink. However, unlike the downlink case, where the prioritization is under control of the scheduler and up to the implementation, the uplink multiplexing is done according to a set of well-defined rules in the terminal as a scheduling grant applies to a specific uplink carrier of a terminal, not to a specific radio bearer within the terminal. Using radio-bearer-specific scheduling grants would increase the control signaling overhead in the downlink and hence per-terminal scheduling is used in LTE.

The simplest multiplexing rule would be to serve logical channels in strict priority order. However, this may result in starvation of lower-priority channels; all resources would be given to the high-priority channel until its transmission buffer is empty. Typically, an operator would instead like to provide at least some throughput for low-priority services as well. Therefore, for each logical channel in an LTE terminal, a prioritized data rate is configured in addition to the priority value. The logical channels are then served in decreasing priority order up to their prioritized data rate, which avoids starvation as long as the scheduled data rate is at least as large as the sum of the prioritized data rates. Beyond the prioritized data rates, channels are served in strict priority order until the grant is fully exploited or the buffer is empty. This is illustrated in FIG. 10.

Regarding FIG. 10, it may be assumed that a priority of the logical channel 1 (LCH 1) is higher than a priority of the logical channel 2 (LCH 2). In case of (A), all prioritized data of the LCH 1 can be transmitted and a portion of prioritized data of the LCH 2 can be transmitted until amount of the scheduled data rate. In case of (B), all prioritized data of the LCH 1 and all prioritized data of the LCH 2 can be transmitted. In case of (C) all prioritized data of the LCH 1 and all prioritized data of the LCH 2 can be transmitted and a portion of data of the LCH 1 can be further transmitted.

Figure 11:
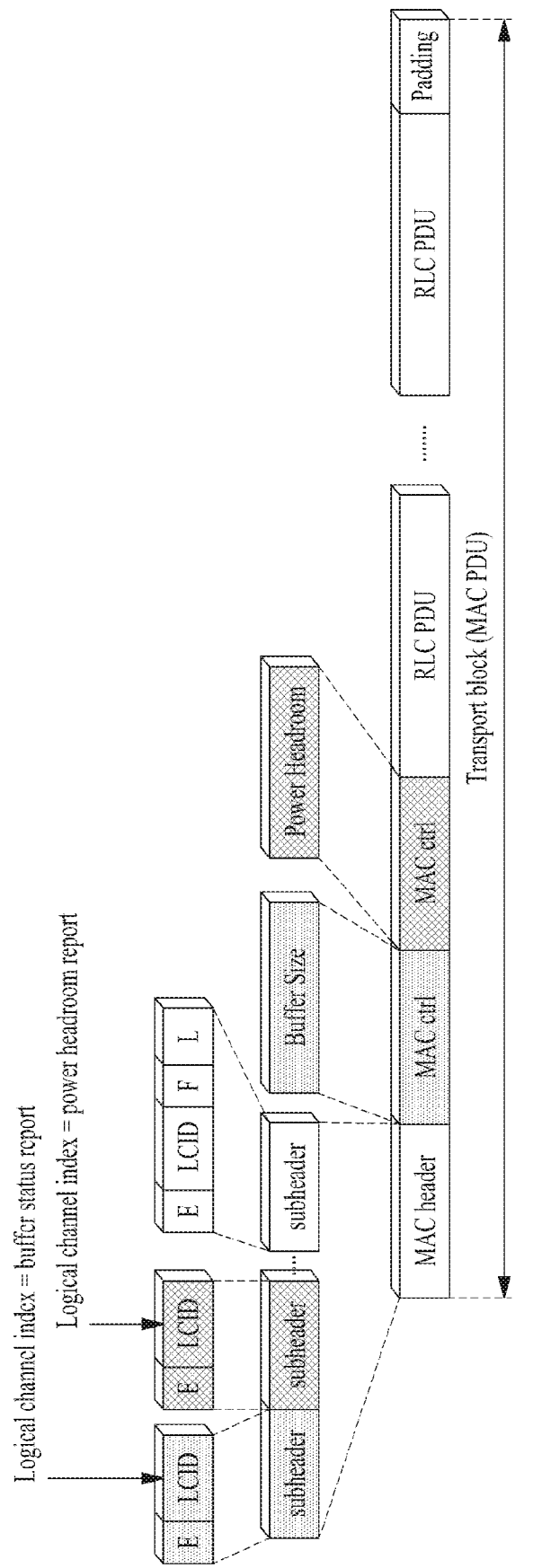
FIG. 11 is a diagram for signaling of buffer status and power-headroom reports.

FIG. 11 is a diagram for signaling of buffer status and power-headroom reports.

The scheduler needs knowledge about the amount of data awaiting transmission from the terminals to assign the proper amount of uplink resources. Obviously, there is no need to provide uplink resources to a terminal with no data to transmit as this would only result in the terminal performing padding to fill up the granted resources. Hence, as a minimum, the scheduler needs to know whether the terminal has data to transmit and should be given a grant. This is known as a scheduling request.

The use of a single bit for the scheduling request is motivated by the desire to keep the uplink overhead small, as a multi-bit scheduling request would come at a higher cost. A consequence of the single bit scheduling request is the limited knowledge at the eNodeB about the buffer situation at the terminal when receiving such a request. Different scheduler implementations handle this differently. One possibility is to assign a small amount of resources to ensure that the terminal can exploit them efficiently without becoming power limited. Once the terminal has started to transmit on the UL-SCH, more detailed information about the buffer status and power headroom can be provided through the inband MAC control message, as discussed below.

Terminals that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The LCD field in one of the MAC subheaders is set to a reserved value indicating the presence of a buffer status report, as illustrated in FIG. 11.

From a scheduling perspective, buffer information for each logical channel is beneficial, although this could result in a significant overhead. Logical channels are therefore grouped into logical-channel groups and the reporting is done per group. The buffer-size field in a buffer-status report indicates the amount of data awaiting transmission across all logical channels in a logical-channel group. A buffer status report represents one or all four logical-channel groups and can be triggered for the following reasons:

i) Arrival of data with higher priority than currently in the transmission buffer—that is, data in a logical-channel group with higher priority than the one currently being transmitted—as this may impact the scheduling decision.

ii) Change of serving cell, in which case a buffer-status report is useful to provide the new serving cell with information about the situation in the terminal.

iii) Periodically as controlled by a timer.

iv) Instead of padding. If the amount of padding required to match the scheduled transport block size is larger than a buffer-status report, a buffer-status report is inserted. Clearly it is better to exploit the available payload for useful scheduling information instead of padding if possible.

Data Available for Transmission in a PDCP Entity

For the purpose of MAC buffer status reporting, the UE shall consider PDCP Control PDUs, as well as the following as data available for transmission in the PDCP entity:

For SDUs for which no PDU has been submitted to lower layers: i) the SDU itself, if the SDU has not yet been processed by PDCP, or ii) the PDU if the SDU has been processed by PDCP.

In addition, for radio bearers that are mapped on RLC AM, if the PDCP entity has previously performed the re-establishment procedure, the UE shall also consider the following as data available for transmission in the PDCP entity:

For SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by the PDCP status report, if received: i) the SDU, if it has not yet been processed by PDCP, or ii) the PDU once it has been processed by PDCP.

Data Available for Transmission in a RLC Entity

For the purpose of MAC buffer status reporting, the UE shall consider the following as data available for transmission in the entity: i) RLC SDUs, or segments thereof, that have not yet been included in an RLC data PDU, ii) RLC data PDUs, or portions thereof, that are pending for retransmission (RLC AM).

In addition, if a STATUS PDU has been triggered and t-StatusProhibit is not running or has expired, the UE shall estimate the size of the STATUS PDU that will be transmitted in the next transmission opportunity, and consider this as data available for transmission in the RLC layer.

Buffer Status Reporting (BSR)

The Buffer Status Reporting (BSR) procedure is used to provide a serving eNB with information about the amount of data available for transmission (DAT) in the UL buffers of the UE. RRC may control BSR reporting by configuring the two timers periodicBSR-Timer and retxBSR-Timer and by, for each logical channel, optionally signaling Logical Channel Group which allocates the logical channel to an LCG (Logical Channel Group).

For the Buffer Status reporting procedure, the UE may consider all radio bearers which are not suspended and may consider radio bearers which are suspended. A Buffer Status Report (BSR) may be triggered if any of the following events occur:

UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the UE has data available for transmission for any of the logical channels which belong to a LCG, in which case the BSR is referred below to as "Regular BSR";

periodicBSR-Timer expires, in which case the BSR is referred below to as "Periodic BSR".

A MAC PDU may contain at most one MAC BSR control element, even when multiple events trigger a BSR by the time a BSR can be transmitted in which case the Regular BSR and the Periodic BSR shall have precedence over the padding BSR.

The UE may restart retxB SR-Timer upon indication of a grant for transmission of new data on any UL-SCH.

All triggered BSRs may be cancelled in case UL grants in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

Figure 12:
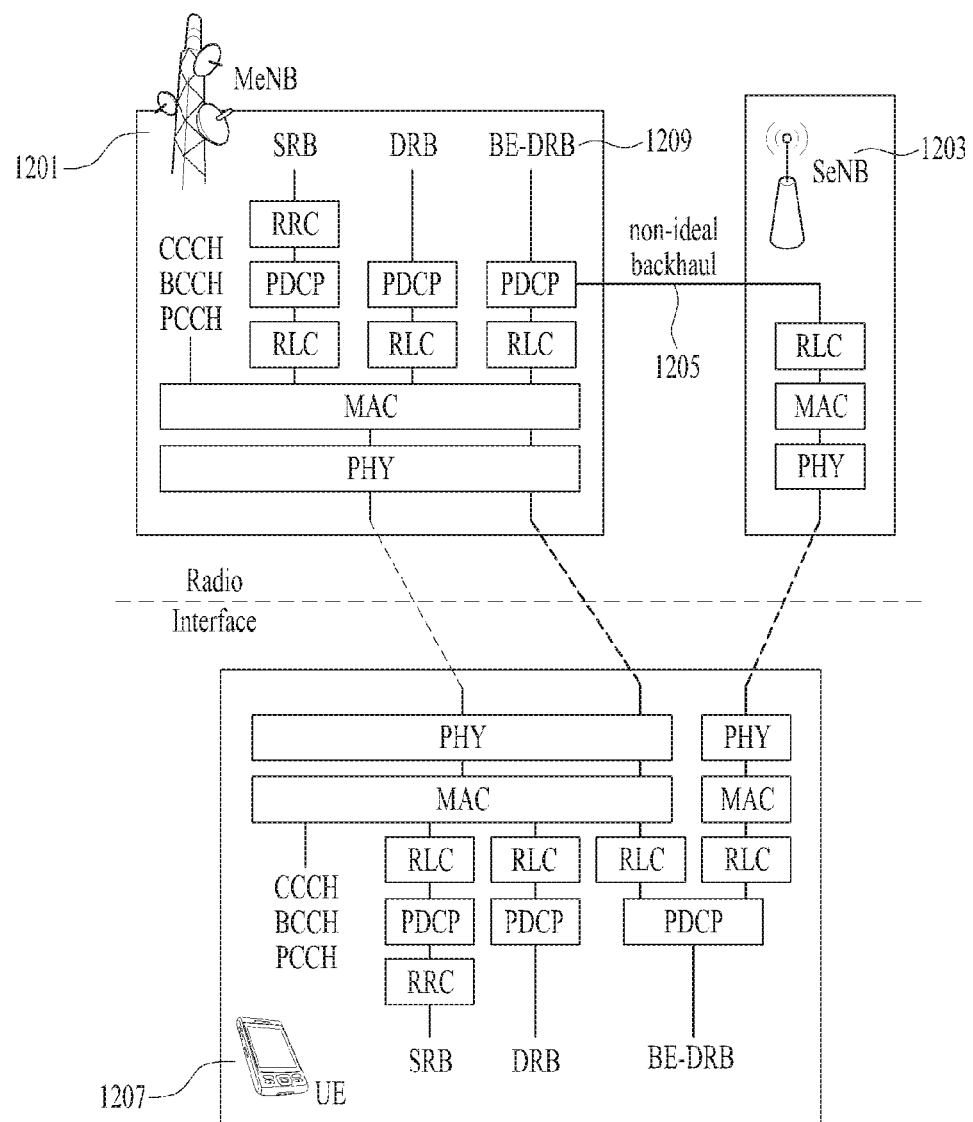
FIG. 12 is a conceptual diagram for one of radio protocol architecture for dual connectivity.

FIG. 12 is a conceptual diagram for one of radio protocol architecture for dual connectivity.

'Data available for transmission' is defined in PDCP and RLC layers to be used for Buffer Status Reporting (BSR), Logical Channel Prioritization (LCP), and Random Access Preamble Group (RAPG) selection in MAC layer. In the prior art, there are only one PDCP entity and one RLC entity for one direction (i.e. uplink or downlink) in a Radio Bearer, and thus, when the UE calculates 'data available for transmission', it just sums up the data available for transmission in PDCP and that in RLC.

However, in LTE Rel-12, a new study on dual connectivity, i.e. UE is connected to both MeNB (1201) and SeNB (1203), as shown in FIG. 12. In this figure, the interface between MeNB (1201) and SeNB (1203) is called Xn interface (1205). The Xn interface (1205) is assumed to be non-ideal; i.e. the delay in Xn interface could be up to 60 ms, but it is not limited thereto.

To support dual connectivity, one of the potential solutions is for the UE (1207) to transmit data to both MeNB (1201) and SeNB (1203) utilizing a new RB structure called dual RLC/MAC scheme, where a single RB has one PDCP—two RLC—two MAC for one direction, and RLC/MAC pair is configured for each cell, as shown in FIG. 12. In this figure, BE-DRB (1209) stands for DRB for Best Effort traffic.

In this case, the MAC functions addressed above, i.e. buffer status reporting, are performed in each MAC, since the UL resource scheduling node is located in different node in the network side, i.e. one in MeNB (1201) and the other in SeNB (1203).

The problem is how to use the information 'data available for transmission in PDCP' in the MAC functions. If each MAC utilizes the same information of 'data available for transmission in PDCP', both the MeNB and the SeNB would allocate UL resource that can cope with 'data available for transmission in PDCP', in which case the 'data available for transmission in PDCP' is considered twice, and it leads to wastage of radio resource.

Figure 13:
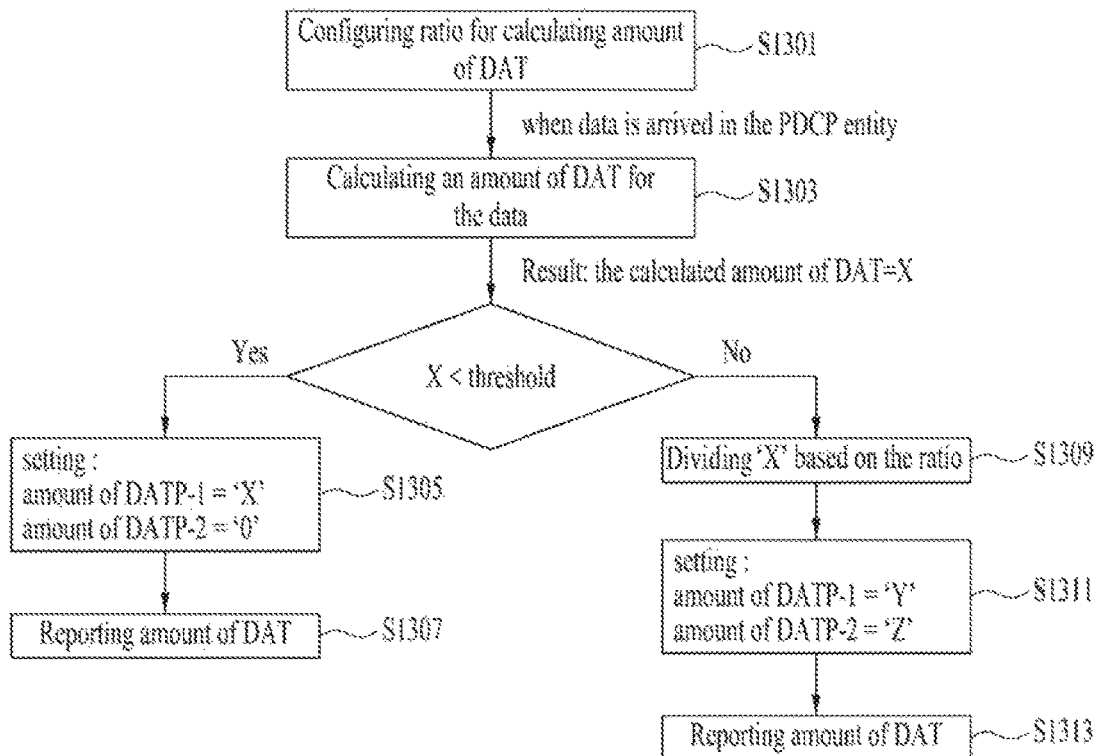
FIG. 13 is a conceptual diagram for reporting amount of data available for transmission according to embodiments of the present invention.

FIG. 13 is a conceptual diagram for reporting amount of data available for transmission according to embodiments of the present invention.

To prevent a first base station and a second base station to over-allocate the UL resource to the UE having dual RLC/MAC scheme, it is invented that the UE divides 'Data Available for Transmission in PDCP' (hereafter called DATP) to each MAC based on ratio.

The ratio may indicate ratio of "amount of PDCP data transmitted to RLC1" to "amount of PDCP data transmitted to RLC2" where RLC1 and RLC2 are connected to the PDCP entity, but it is not limited thereto. The RLC1 is for the first base station and RLC2 is for the second base station.

Desirably, the first base station may be a MeNB and the second base station may be a SeNB, and vice versa.

The ratio may be configured by the first base station or the second base station through RRC signaling or PDCP signaling or MAC signaling, when a radio bearer is configured or reconfigured (S1301). The ration is for calculating amount of Data Available for Transmission (DAT) in a PDCP (Packet Data Convergence Protocol) entity. The ratio can be a form of ratio "DATP-1 (DATP for MAC in the first base station): DATP-2 (DATP for MAC in the second base station", or percentile amount of DATP-2 compared to DATP-1, or vice versa, or any type of information that indicates the amount of data that can be used to divide the DATP to DATP-1 and DATP-2.

The UE can calculate an amount of DAT when data is arrived in the PDCP entity (S1303).

When the UE calculates the DATP and divides it into DATP-1 and DATP-2, if the DATP is less than a threshold, the UE does not divide the DATP into DATP-1 and DATP-2. The threshold may be called as "minimum amount of data in PDCP".

When the result of the step of S1303 is "X", consequently, the UE can set a first amount of DAT (DATP-1) as the calculated amount of DAT (X) and a second amount of DAT (DATP-2) as 0 or the first amount of DAT (DATP-1) as 0 and the second amount of DAT (DATP-2) as the calculated amount of DAT (X)" when DATP is less than the threshold (S1305). This method aims at reducing the waste of UL resource considering the minimum amount of UL resources to be assigned to the UE.

The UE may receive the information related to the threshold from the first base station or the second base station. The information related to the threshold may indicate the minimum amount of data in PDCP in byte.

The UE may receive configuration information through RRC signaling from the first base station or the second base station. When the UE calculates DATP (S1303), if it is less than the threshold, the UE can select one of DATP-1 or DATP-2 by following the priority received from the first base station/the second base station or can randomly select one of DATP-1 or DATP-2.

The priority indicates which base station is prioritized over other base station. Then, the UE sets the selected DATP-1 or DATP-2 equal to DATP. For example, when the DATP is less than the threshold, if the DATP-1 is prioritized over the DATP-2 by the first base station or the second base station, the UE divides DATP into DATP-1 and DATP-2 so that "DATP-1=X bytes" and "DATP-2=0 byte".

After the step of S1305, the UE can report the amount of DAT to the BS (S1307). In this case, the UE can report the amount of DATP-1 to the first base station and can report the amount of DATP-2 to the second base station. If the amount of DATP-2 is '0', the UE can report the amount of DATP-1 to the first base station but the UE may not report the amount of DATP-2 to the second base station.

Meanwhile, when the UE calculates the DATP and divides it into DATP-1 and DATP-2, if the DATP is equal to or more than the threshold, the UE may divide the DATP into DATP-1 and DATP-2 based on the ratio (S1309). In this case, the UE may set a first amount of DAT (DATP-1) as 'Y' and a second amount of DAT (DATP-2) as 'Z' based on the ratio when DATP is equal to or more than the threshold (S1311).

When the UE calculates the DATP and divides it into DATP-1 and DATP-2 using the ratio, there is a case that the DATP-1 and DATP-2 are not the multiple of bytes. Since the UL resource is always assigned by bytes, the UE aligns DATP-1 and DATP-2 with the multiple of bytes as follows:

If the DATP-1 and DATP-2 are not the multiple of bytes,

The UE rounds off DATP-1 and DATP-2 to the nearest integer. For example, when the DATP=101 bytes, if the UE divides the DATP using the ratio of 3:7, the DATP-1=30.3 bytes and DATP-2=70.7 bytes. In this case, the UE rounds off DATP-1 and DATP-2 so that the DATP-1 is 30 bytes and DATP-2 is 71 bytes. The UE also can round off/roundup/rounddown one or both of DATP-1 and DATP-2.

The UE adds the remaining amount of data to DATP-1 or DATP-2. For example, if the DATP=101 bytes, the DATP-1=30.3 bytes and DATP-2=70.7 bytes. In this case, the UE adds the remaining 0.3 bytes of DATP-1 to the DATP-2 so that the DATP-1 is 30 bytes and DATP-2 is 71 bytes.

After the step of S1311, the UE can report the amount of DAT to the BS (S1313). In this case, the UE can report the amount of DATP-1 to the first base station and can report the amount of DATP-2 to the second base station.

Figure 14:
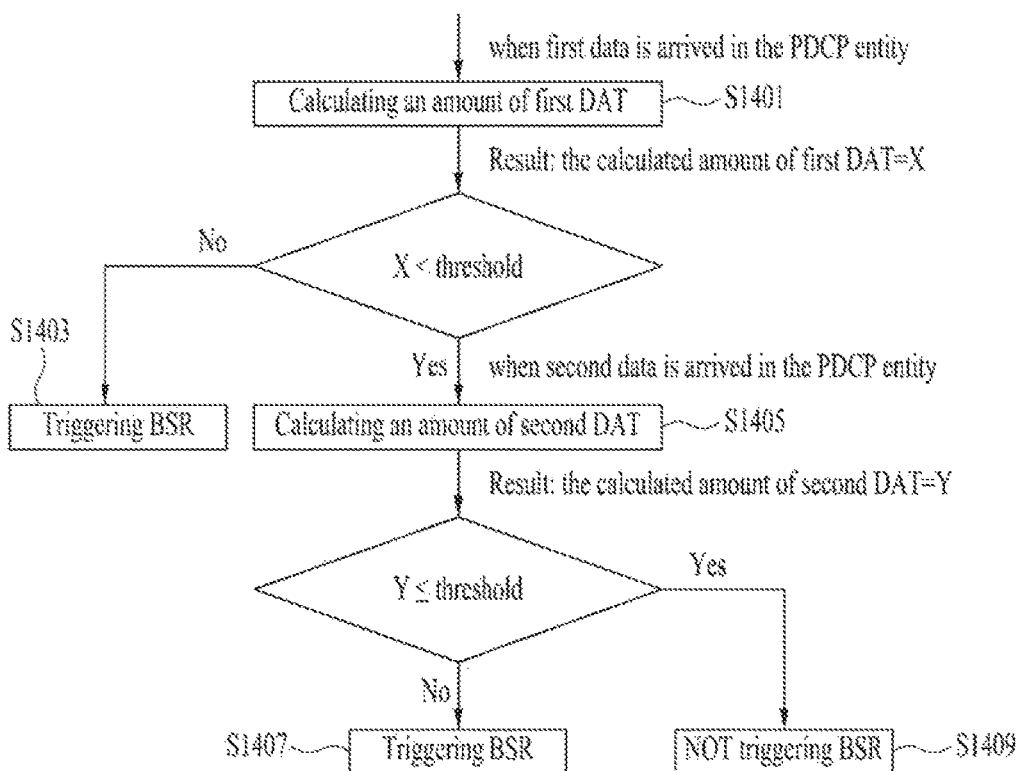
FIG. 14 is a conceptual diagram for triggering a buffer status reporting according to embodiments of the present invention

FIG. 14 is a conceptual diagram for triggering a buffer status reporting according to embodiments of the present invention.

The Buffer Status Reporting (BSR) procedure is used to provide a serving BS with information about the amount of data available for transmission (DAT) in the UL buffers of the UE. For the Buffer Status reporting procedure, the UE may consider all radio bearers which are not suspended and may consider radio bearers which are suspended.

In this prior art, a Buffer Status Report (BSR) may be triggered when UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR". That means, when data belongs to a logical channel with same priority as the priorities of the logical channels which belong to any LCG and for which data is already available for transmission, the BSR is not triggered.

However, in dual connectivity system, the UE is required to trigger the BSR although data belongs to a logical channel with same priority as the priorities of the logical channels which belong to any LCG and for which data is already available for transmission.

Regarding FIG. 14, when the first data is arrived in a protocol entity, the UE can calculate an amount of first DAT (S1401). Desirably, the protocol entity is a PDCP entity, but it is not limited thereto.

When the result of the step of S1401 is "X", if the X is less than a threshold, the UE can set an amount of DAT for a first logical channel (DATP-1) as the calculated amount of DAT (X) and an amount of DAT for a second logical channel (DATP-2) as 'zero'. The first logical channel is for the first BS and the second logical channel is for the second BS. On the other hand, if the X is equal to or more than a threshold, the UE may trigger a BSR (S1403).

After the step of S1401, when the second data is arrived in a protocol entity, the UE can calculate an amount of second DAT (S1405). When the result of the step of S1405 is "Y", if the Y is equal to or more than the threshold, the UE can trigger the BSR (S1407) although data belongs to a logical channel with same priority as the priorities of the logical channels which belong to any LCG and for which data is already available for transmission. If the Y is less than the threshold, the UE cannot trigger the BSR (S1409).

In conclusion, in view of the second logical channel, the second logical channel has a lower priority than the first logical channel. Thus, in the step of the S1401, if X is less than the threshold, an amount of DAT for a second logical channel is set to '0'. BSR of the second logical channel is not triggered despite having the data. In the step of S1405, if Y is equal to or more than the threshold, the amount of DAT for a second logical channel is set to some byte based on the certain ratio. In this case, the BSR of the second logical channel is required to trigger the BSR although the data belongs to a logical channel with same priority as the priorities of the logical channels which belong to any LCG and for which data is already available for transmission. Thus, the UE can trigger the BSR when the amount of first DAT is less than a threshold and the amount of second DAT is more than the threshold.

Figure 15:
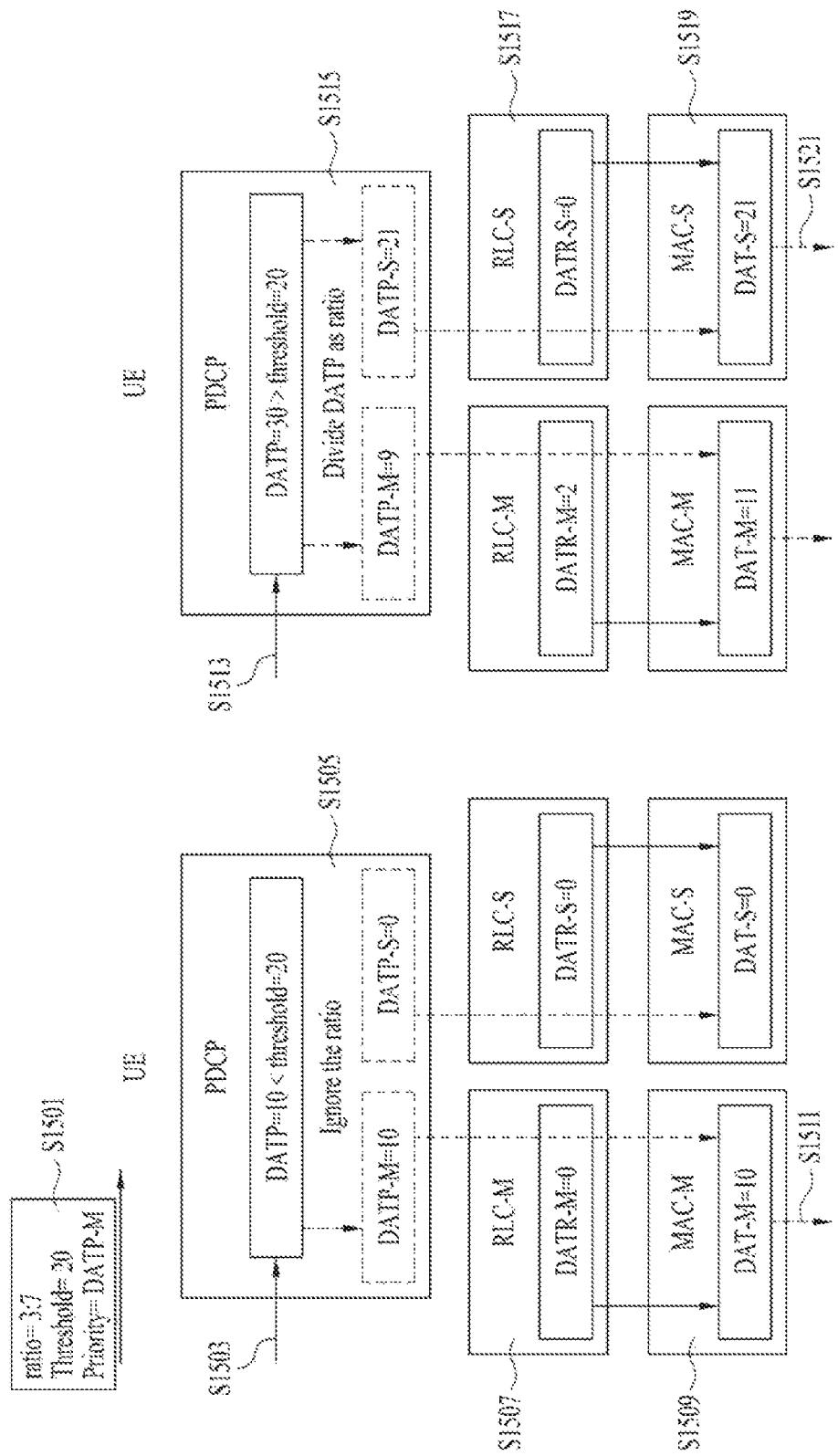
FIG. 15 is a conceptual diagram according to embodiments of the present invention.

FIG. 15 is a conceptual diagram according to embodiments of the present invention.

An example procedure of this invention is shown in FIG. 15, but this is one of example according to embodiments of the present invention, so it is not limited thereto.

The UE receives ratio information of a RB identified by RB ID from an MeNB or a SeNB. In this example, the ratio is set to 3:7. The UE also receives threshold information. The threshold is set to 20 bytes and DATP-M is prioritized over DATP-S in this example (S1501). The 'DATP-M' is Data Available for Transmission in PDCP for the MeNB and the 'DATP-S' is Data Available for Transmission in PDCP for the SeNB.

The first data for the indicated RB are arrived (S1503). The UE calculates the DATP. Since the DATP is 10 bytes and less than 20 bytes, the UE does not divide it into DATP-M and DATP-S so that DATP-M=10 bytes and DATP-S=0 byte (S1505).

For the indicated RB, the UE calculates the DATR-M (Data Available for Transmission in RLC for the MeNB) and DATR-S (Data Available for Transmission in RLC for the SeNB). In this example, DATR-M=0 bytes and DATR-S=0 bytes (S1507). For the indicated RB, the UE calculates DAT-M (Data Available for Transmission for the MeNB) and DAT-S (Data Available for Transmission for the SeNB) such as DAT-M=DATP-M+DATR-M and DAT-S=DATP-S+DATR-S. In this example, DAT-M=0+10=10 bytes, and DAT-S =0+0=0 bytes (S1509). Since this is an initial transmission and the DATP is less than threshold, the UE sends the BSR only to the MeNB (S1511).

For the indicated RB, the data belonging to the same logical channel are arrived (S1513). For the indicated RB, the UE calculates the DATP. Since the DATP is 30 bytes, which is more than 20 bytes, and the previous DATP is less than the threshold, the UE triggers BSR and divides it into DATP-M and DATP-S using ratio (S1515). Consequently, DATP-M=9 bytes and DATP-5=21 byte.

For the indicated RB, the UE calculates the DATR-M and DATR-S. In this example, DATR-M=2 bytes and DATR-S=0 bytes (S1517).

For the indicated RB, the UE calculates DAT-M and DAT-S. In this example, DAT-M=2+9=11 bytes, and DAT-S=0+21=21 bytes (S1519). The UE sends the BSR to both of MeNB and SeNB with the calculated buffer size (S1521) because the BSR is triggered in the step of S1515.

Figure 16:
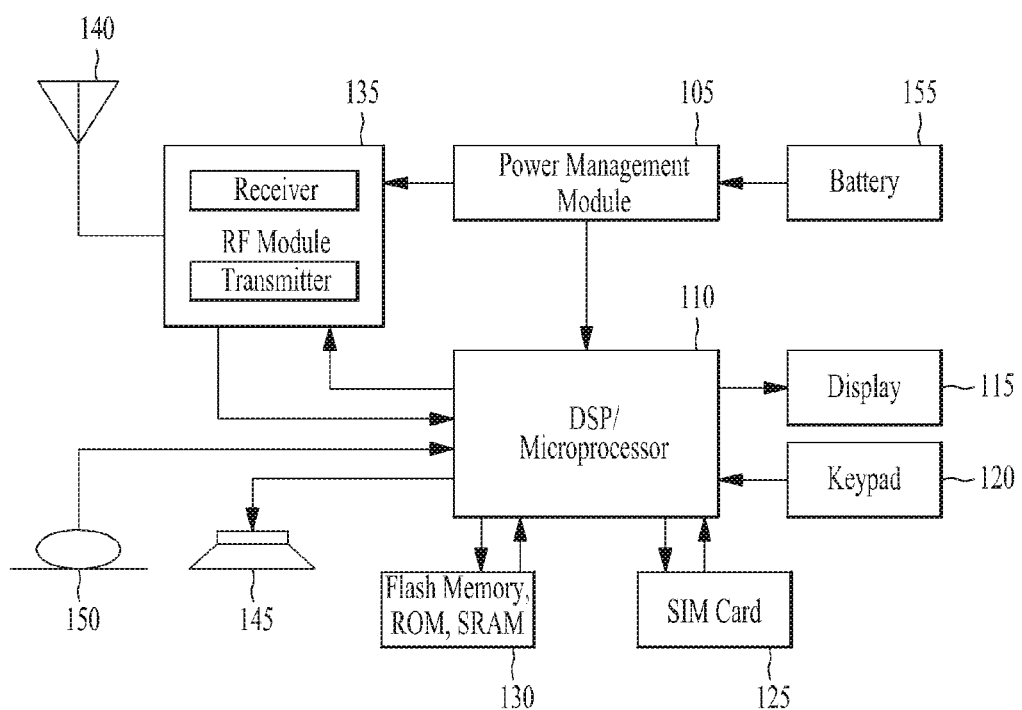
FIG. 16 is a block diagram of a communication apparatus according to an embodiment of the present invention.

FIG. 16 is a block diagram of a communication apparatus according to an embodiment of the present invention.

The apparatus shown in FIG. 16 can be a user equipment (UE) and/or eNB adapted to perform the above mechanism, but it can be any apparatus for performing the same operation.

As shown in FIG. 16, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 16 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 16 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

While the above-described method has been described centering on an example applied to the 3GPP LTE system, the present invention is applicable to a variety of wireless communication systems in addition to the 3GPP LTE system.

What is claimed is:

1. A method performed by a base station (BS) operating in a wireless communication system, the method comprising:
   transmitting, to a user equipment (UE), a threshold value related to an uplink data split operation; and
   receiving, from the UE, a buffer status report regarding an uplink data volume of the UE, the buffer status report being based on the threshold value,
   wherein the uplink data volume of the UE comprises a packet data convergence protocol (PDCP) data volume of the UE, and
   wherein the uplink data split operation relates to whether the uplink data volume of the UE is reported by either one or both of a first Medium Access Control (MAC) entity and a second MAC entity of the UE, depending on the threshold value.

2. The method of claim 1, wherein the uplink data volume further comprises a radio link control (RLC) data volume of the UE.

3. The method according to claim 2, wherein the received buffer status report is further based on the RLC data volume of the UE.

4. The method according to claim 2, wherein the RLC data volume of the UE indicates an amount of data that is available for transmission at an RLC entity of the UE.

5. The method according to claim 1, wherein the PDCP data volume of the UE indicates an amount of data that is available for transmission at a PDCP entity of the UE.

6. The method of claim 5, wherein receiving the buffer status report comprises:
   receiving the buffer status report which indicates the uplink data volume that includes both the PDCP data volume of the UE and the RLC data volume of the UE.

7. The method of claim 1, wherein transmitting the threshold value related to the uplink data split operation is performed via Radio Resource Control (RRC) signaling.

8. A base station (BS) configured to operate in a wireless communication system, the BS comprising:
   at least one radio-frequency (RF) module;
   at least one processor; and
   at least one computer memory operably connectable to the at least one processor and storing instructions that, when executed, cause the at least one processor to perform operations comprising:
      controlling the at least one RF module to transmit, to a user equipment (UE), a threshold value related to an uplink data split operation; and
      controlling the at least one RF module to receive, from the UE, a buffer status report regarding an uplink data volume of the UE, the buffer status report being based on the threshold value,
      wherein the uplink data volume of the UE comprises a packet data convergence protocol (PDCP) data volume of the UE, and
      wherein the uplink data split operation relates to whether the uplink data volume of the UE is reported by either one or both of a first Medium Access Control (MAC) entity and a second MAC entity of the UE, depending on the threshold value.

9. The BS of claim 8, wherein the uplink data volume further comprises a radio link control (RLC) data volume of the UE.

10. The BS according to claim 9, wherein the received buffer status report is further based on the RLC data volume of the UE.

11. The BS according to claim 9, wherein the RLC data volume of the UE indicates an amount of data that is available for transmission at an RLC entity of the UE.

12. The BS according to claim 8, wherein the PDCP data volume of the UE indicates an amount of data that is available for transmission at a PDCP entity of the UE.

13. The BS of claim 12, wherein controlling the at least one RF module to receive the buffer status report comprises:
   controlling the at least one RF module to receive the buffer status report which indicates the uplink data volume that includes both the PDCP data volume of the UE and the RLC data volume of the UE.

14. The BS of claim 8, wherein controlling the at least one RF module to transmit the threshold value related to the uplink data split operation is performed via Radio Resource Control (RRC) signaling.

* * * * *